United States Patent [19]

Arendt

[11] Patent Number: 4,487,755
[45] Date of Patent: Dec. 11, 1984

[54] PREPARATION OF LARGE CRYSTAL SIZED BARIUM AND/OR STRONTIUM TITANATE POWDER

[75] Inventor: Ronald H. Arendt, Schenectady, N.Y.

[73] Assignee: General Electric Company, Schenectady, N.Y.

[21] Appl. No.: 522,085

[22] Filed: Aug. 11, 1983

Related U.S. Application Data

[63] Continuation of Ser. No. 394,357, Jul. 1, 1982, abandoned.

[51] Int. Cl.³ .................. C01G 23/00; C01F 11/00
[52] U.S. Cl. ................................ 423/598; 423/593; 23/301; 23/305 RE
[58] Field of Search .............. 423/598, 593, DIG. 12; 23/301 R, 305 RE

[56] References Cited

U.S. PATENT DOCUMENTS

| | | | |
|---|---|---|---|
| 3,503,717 | 3/1970 | Wilson et al. | 23/301 R |
| 3,567,642 | 3/1971 | Flanigen | 23/301 R |
| 4,233,282 | 11/1980 | Arendt | 423/593 |

OTHER PUBLICATIONS

Blattner et al., "Single Crystals of Barium-Titanium Compounds", Helv. Phys. Actn., 20, 225-8, (1947).
Skoog et al., "Fundamentals of Analytical Chemistry," Holt, Rinehart and Winston, New York, pp. 160-161.

*Primary Examiner*—Delbert E. Gantz
*Assistant Examiner*—Chung K. Pak
*Attorney, Agent, or Firm*—Jane M. Binkowski; James C. Davis, Jr.; James Magee, Jr.

[57] ABSTRACT

A mixture of an alkali carbonate solvent salt, titanium oxide, an alkaline earth reactant selected from the group consisting of barium oxide, strontium oxide and mixtures thereof, and alkaline earth titanate seed is heated to melt the carbonate salt solvent in which the titanium oxide and alkaline earth reactant dissolve and react precipitating a titanate selected from the group consisting of barium titanate, strontium titanate and mixtures or solutions thereof onto said titanate seed producing large crystal sized powder, said titanate seed not differing significantly in chemical composition from the titanate being precipitated thereon.

4 Claims, No Drawings

PREPARATION OF LARGE CRYSTAL SIZED BARIUM AND/OR STRONTIUM TITANATE POWDER

This application is a continuation of application Ser. No. 394,357, filed July 1, 1982 now abandoned.

The present invention relates to the preparation of large crystal sized barium titanate powder, strontium titanate powder, and mixtures, i.e. solutions thereof, which also possesses a relatively narrow average crystal size distribution. By crystal it is meant herein crystallite or individual crystal.

Conventionally, barium or strontium titanate powder is prepared by the high temperature solid state reaction of appropriate precursor compounds. The reaction product is in the form of relatively large, strong self-bonded particle aggregates which must be comminuted to the desired approximately 1.0 micron particle size before fabrication into ceramic articles.

One of the inadequacies of this conventional procedure is that the product, in commercial practice, is not fully reacted to yield uniform stoichiometry on a microscopic level. In cases where the physicochemical properties depend on the composition and its uniformity, the nonuniform composition of the conventional product can lead to less than optimum properties. Although procedures can be adopted in the conventional process to minimize these variations, the penalty in additional effort can be considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten carbonate salt solvent with subsequent precipitation of the product which does not require comminution. In the present process, the reactants are slightly soluble in the molten carbonate salt solvent, therefore allowing literally atomic mixing in the liquid phase of the reactants. The solubilities of the reactants are such that they exceed the corresponding solubilities determined by the solubility product of the product in the molten carbonate salt solvent. Hence, the reaction product precipitates spontaneously from the molten salt solution. The reactants will continually dissolve to maintain a reactant-saturated solution until they are totally consumed by product formation.

Conventional, solid state transport synthetic techniques can yield the desired average crystal size, but they are incapable of yielding material with a narrow crystal size distribution.

U.S. Pat. Nos. 4,233,282 and 4,293,534 to Arendt, assigned to the assignee hereof and incorporated herein by reference, disclose the use of molten solvents to prepare narrow size distribution $SrTiO_3$ powder, but the maximum individual grain or crystals achieved in those preparations were up to about 1.0 μm. The present invention overcomes the limitations of maximum attainable average crystal size obtained with this prior art molten salt syntheses, while retaining the narrow particle size distribution characteristics of those preparations.

Specifically, U.S. Pat. No. 4,233,282 discloses the production of small crystallite size $SrTiO_3$ or $BaTiO_3$ powder by heating a mixture of SrO and/or BaO, $TiO_2$ and an alkali chloride solvent salt, which can be a chloride of Na, K or mixtures thereof, to melt the chloride solvent in which the reactants dissolve and react precipitating the titanate. With respect to the production of the titanate, U.S. Pat. Nos. 4,293,534 differs from 4,233,282 in that the solvent is NaOH, KOH and mixtures thereof.

Briefly stated, the present process for producing large size alkaline earth titanate powder comprises providing particulate $TiO_2$ in at least stoichiometric amount or particulate precursor therefor, providing particulate alkaline earth oxide in at least stiochiometric amount or particulate precursor therefor, said alkaline earth-oxide being selected from the group consisting of BaO, SrO and mixtures thereof, providing alkaline earth titanate seed selected from the group consisting of barium titanate, strontium titanate and a solid solution thereof, providing an alkali metal carbonate solvent selected from the group consisting of sodium carbonate, potassium carbonate, lithium carbonate and mixtures thereof, forming a mixture of said $TiO_2$ or precursor therefor, said alkaline earth oxide or precursor therefor, said titanate seed and said carbonate solvent, heating said mixture to a reaction temperature at least sufficient to melt said carbonate solvent and ranging from about 873 K. to about 1473 K., each said precursor decomposing completely at or below said reaction temperature to form said oxide and by-product gas, said carbonate solvent in molten form being a solvent for said $TiO_2$ and said alkaline earth oxide, maintaining said reaction temperature dissolving and reacting said $TiO_2$ and alkaline earth oxide in said molten salt and precipitating alkaline earth titanate onto said titanate seed, said titanate seed having an average crystal size ranging from submicron to about 10 microns and being used in an amount of at least about 50% by weight of the theoretical amount of said large size alkaline earth titanate powder, said titanate seed not differing significantly in chemical composition from said precipitating alkaline earth titanate, said carbonate solvent being used in an amount of at least about 20% by weight of the total amount of said $TiO_2$, said alkaline earth oxide, said titanate seed and said carbonate solvent, and recovering the resulting alkaline earth titanate.

The reactions for producing the present alkaline earth titanates are as follows:

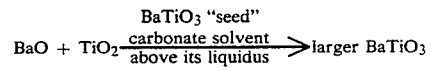

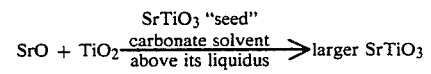

All of the reactants, i.e. $TiO_2$ and alkaline earth oxide, are used in at least stoichiometric amounts to achieve complete reaction. Preferably, as a practical matter and to insure production of a completely reacted precipitated product, BaO and/or SrO are used in an amount ranging from about 2% by weight to about 10% by weight in excess of stoichiometric. There is no advantage in using amounts of BaO and/or SrO higher than 10% by weight in excess of stoichiometric.

In carrying out the present process, the reactants or precursors therefor as well as the titanate seed, can be of commercial or technical grade, and their particular purity depends largely on the particular application of the resulting large size alkaline earth titanate powder. Specifically, the reactant oxides and the titanate seed should not contain any impurities which would have a significantly deleterious effect on the present alkaline earth titanate product, or on its particular application.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders should also be free of large, hard aggregates, i.e. significantly above 100 microns in size, which might survive the mixing process and prevent sufficient reactant contact for satisfactory reaction rates.

The titanate seed is used in an amount ranging from about 50% by weight to about 90% by weight of the total amount of alkaline earth titanate present upon completion of the reaction, i.e. the theoretical amount of the large size alkaline earth titanate powder produced according to the present invention. Use of titanate seed in an amount less than about 50% by weight of the total amount of the present alkaline earth titanate product does not suppress nucleation and allows precipitation of virgin material that will not deposit on the seed. On the other hand, use of the titanate seed in amounts in excess of about 90% by weight is not practical. Also, with all other parameters being equivalent, by variation of the seed content of a given reactant mix, it should be possible to prepare the present alkaline earth titanate crystals with any preselected average crystal size in the range of about 0.3 micron to about 14 microns. In order that the present large sized alkaline earth titanate crystals be physically stable through a wide temperature range, i.e. from about 25° C. to about 2000° C., the chemical composition of the titanate being precipitated and that of the titanate seed should be substantially the same. Specifically, the chemical composition of the precipitated titanate deposited on the titanate seed and that of the titanate seed should not differ significantly.

The present alkaline earth titanate seed is monodispersed and has an average crystal size ranging from submicron to about 10 microns. As a practical matter, the minimum average crystal size of the titanate seed is about 1 micron. Titanate seed having an average crystal size larger than about 10 microns may be used but provides no significant advantage since it appears that the largest average crystal size titanate powder producible by the present process is about 14 microns.

Preferably, the barium and/or strontium titanate seed is produced according to U.S. Pat. Nos. 4,233,282 or 4,293,534. Most preferably, the titanate seed is produced according to copending Ser. No. 394,356 for "Molten Salt Synthesis of Barium and/or Strontium Titanate Powder" filed on July 1, 1982 in the names of R. H. Arendt and W. D. Pasco, and assigned to the assignee hereof an incorporated herein by reference. Specifically, copending Ser. No. 394,356 discloses that a mixture of an alkali metal carbonate solvent, titanium oxide, and an alkaline earth reactant selected from the group consisting of barium oxide, strontium oxide, and mixtures thereof, is heated to melt the alkali metal carbonate solvent in which the reactants dissolve and react precipitating a titanate selected from the group consisting of barium titanate, strontium titanate and mixtures thereof having an average crystal size ranging from about 0.3 micron to about 2 microns.

In the present process the carbonate solvent is selected from the group consisting of sodium carbonate, potassium carbonate, lithium carbonate and mixtures thereof. The carbonate solvent is used in a minimum amount of at least about 20% by weight of the total amount of seed, reactant oxides and carbonate solvent. Lithium carbonate as a solvent is an exception in that when it is used, it will also produce a small amount of $Li_2TiO_3$, but the formation of $Li_2TiO_3$ can be suppressed by using the alkaline earth oxide reactant in an excess amount of at least about 10 weight %. Typically, the present carbonate solvent is used in an amount of about 50% by weight of the total amount of reactants and carbonate solvent. Amounts of carbonate solvent lower than about 20% by weight are not practical since the desired reaction will not proceed to completion. There is no upper critical maximum amount of carbonate but amounts of carbonate higher than about 70% by weight of the total amount of reactant oxides and carbonate solvent provide no significant advantage. As the amount of carbonate is increased from 20% by weight to about 50% by weight, the amount of individual grains or crystals present in the resulting alkaline earth titanate powder increases correspondingly as does the individual crystal size, and with an amount of carbonate solvent above about 50% by weight, substantially all or all of the titanate powder recovered consists essentially of individual grains or crystallites, i.e. it is monodispersed.

The reactants or precursors therefor, the titanate seed and the alkali carbonate solvent are admixed to produce a substantially thorough mixture to insure good contact and complete reaction. The actual mixing operation can be carried out in several ways which do not introduce undesirable impurities into the resulting product. Preferably, water at room or ambient temperature is admixed with the reactant oxides or precursors therefor, the titanate seed, and the carbonate solvent in an amount which, with stirring, is at least sufficient to form a slurry. The wet mixing can be carried out, for example, using a plastic milling medium or by wet mixing in a high speed blender with preferably distilled or deionized water, depending on the application of the resulting product and preferably, with stainless steel or plastic stirrers, for example a propeller, in a stainless steel or plastic, preferably Teflon, lined vessel.

The present reaction temperature ranges from about 873 K. (600° C.) to about 1473 K. (1200° C.). A reaction temperature below about 873 K. produces a product which is incompletely reacted, i.e. it contains unreacted $TiO_2$. On the other hand, a temperature higher than about 1473 K. is likely to cause significant vapor loss of the molten carbonate solvent and crucible interaction. The particular reaction temperature used depends largely on the reaction rate desired, i.e. rate of precipitation of alkaline earth titanate desired. Generally, the higher the reaction temperature, the faster is the reaction rate. Preferably, the reaction temperature ranges from about 1073 K. to about 1273 K. since it is not difficult to maintain and provides high reaction rates without significant vapor loss of the molten carbonate solvent.

In molten form, the present carbonate is a solvent for the reactant oxides. For sodium carbonate alone the melting point, i.e. liquidus temperature, is about 1131 K., whereas for potassium carbonate alone it is about 1171 K. All mixtures of potassium carbonate and sodium carbonate and/or lithium carbonate melt below the melting point of potassium carbonate alone. As shown by their phase diagrams, for the eutectic mixture of 58 mole % sodium carbonate/balance potassium carbonate, the liquidus temperature is about 983 K. For the eutectic 53.3 mole % $Li_2CO_3$/balance $Na_2CO_3$, the liquidus temperature is about 769 K. For the eutectic 42.7 mole % $Li_2CO_3$/balance $K_2CO_3$, the liquidus temperature is about 771 K., whereas for the eutectic 62 mole % $Li_2CO_3$/balance $K_2CO_3$, the liquidus temperature is about 761 K.

Preferably, in the present invention, the minimum reaction temperature is at least about 10 K. above the liquidus temperature of the carbonate solvent since such a temperature insures complete melting of carbonate solvent and also increases the fluidity of the molten carbonate producing increased wetting of the reaction mixture. Reaction temperatures always should be maintained below the melting point of the alkaline earth product being precipitated, which for $SrTiO_3$ is about 2311 K. and for $BaTiO_3$ is about 1889 K.

At reaction temperature the carbonate is molten and the reactant oxides dissolve and react in the molten carbonate precipitating the alkaline earth titanate onto the titanate and enclosing the titanate seed with precipitated titanate producing the present integral large size titanate crystal. The higher the reaction temperature, the more rapid the reaction becomes. If the titanate seed is of substantially the same particle size, the resulting large sized titanate powder also will be of substantially the same size, or it will have a relatively narrow sized distribution. The crystals of the present product are, or would be expected to be, roughly cubic.

Reaction temperature is maintained until the reaction is completed. Reaction time is a strong function of the reaction temperature used, varying in an inverse fashion. For reaction temperatures ranging from about 1073 K. to about 1273 K., a reaction time of about two hours for complete reaction is suitable. When the reaction is completed, the reacted mass is cooled at any convenient rate, preferably in air and preferably to about room temperature.

The cooled alkaline earth titanate-containing reacted mass is a solid, fired cake comprised of alkaline earth titanate particles or crystals distributed throughout a matrix of solidified carbonate. Specifically, the alkaline earth titanate, which is maintained as distinct second phase crystals, is present as crystals embedded in the carbonate matrix.

The present alkaline earth titanate can be recovered by a number of techniques which dissolve away the carbonate solvent. Preferably, the titanate-containing reacted mass is contacted and admixed at room temperature with dilute aqueous acid, preferably having a pH of about 4 to 5, preferably acetic acid, in an amount sufficient to react quantitatively with any excess barium or strontium component to produce a compound which is soluble in the resulting acidic solution. For example, acetic acid produces the acetate of barium and/or strontium which is soluble in aqueous acetic acid. The acid also preferably converts the carbonate of potassium, sodium or lithium to a compound which also is soluble in the resulting aqueous acidic solution leaving the present titanate powder dispersed in the resulting aqueous solution. For example, the acetic acid also converts the carbonate of potassium, sodium or lithium to a compound which also is soluble in the aqueous acetic solution leaving the present titanate powder dispersed in an aqueous solution of acetates. A flocculating agent which is organic and soluble in water, preferably an anionic flocculant, is added in an amount which is sufficient to flocculate and settle the alkaline earth titanate powder. Preferably, the flocculating agent is added in aqueous solution, about 0.1 gram of flocculant per 100 grams of water usually being satisfactory, and preferably the flocculating agent is used only in an amount necessary to settle the powder. The supernatant liquid is then decanted.

Preferably, after several washings with water and settlings with flocculating agent and decantations of the supernatant liquid, the wet powder is dried. For production of barium and/or strontium titanate powder of high purity, the flocculating agent should be completely removable by heating the powder in air at temperatures below the melting point of the powder and preferably not higher than about 1073 K. Preferably, to remove any remaining water and flocculant, it is heated at about 523 K. for about 20 minutes.

Alternatively, in the present process, if desired, a particulate inorganic precursor of the reactant oxides can be used. The precursor should decompose completely to form the oxide and by-product gas or gases leaving no contaminants in the reacted mass. Representatives of the precursors of the reactant oxides useful in the present process are the carbonates, hydroxides and nitrates. The precursor should be used in an amount sufficient to produce the respective oxide in at least stoichiometric amount.

The present alkaline earth titanate powder ranges in color from a slightly off-white to a tan. The alkaline earth titanate powder is free-flowing and can be in the form of aggregates or in the form of individual powder crystals, but usually it is a mixture of both. The aggregates which range in size from about 1 micron to about 20 microns, are particles consisting essentially of a cluster of smaller sized crystals weakly bonded together autogeneously, i.e. such bonding is believed to be caused by Van der Waal's forces or by self-bonding, i.e. neck growth between grains. The aggregates are friable at room temperature and are readily broken down with very gentle comminution during subsequent pressing into a green body. The bigger the alkaline earth titanate crystal, the less the aggregation. Thus, the present crystals having an average crystal size of about 2 microns or larger are monodispersed. It appears that the largest average crystal size titanate powder producible by the present process is about 14 microns. On the other hand, the present process would not be practical for producing alkaline earth titanate crystals with an average size less than about 0.3 micron.

The present process produced integral large sized crystals of barium titanate, strontium titanate or solid solutions thereof. Since alkaline earth titanate is produced by precipitation from a saturated solution, the precipitated titanate is chemically homogeneous, i.e. it is of uniform composition on a microscopic level. The present large size alkaline earth titanate powder can be prepared free of impurities or free of significant impurities. Therefore, when the same procedure is used, its properties are reproducible from batch to batch.

The present large size alkaline earth titanate powder has a number of uses. It has good dielectric properties and it could be admixed with, for example, a polymer to produce a composite with improved dielectric properties. Alternatively, it can be pressed at room temperature into a green body of desired size and shape. For example, the $SrTiO_3$ powder in such pressed form would be useful as an electrolyte supporting matrix in a molten carbonate fuel cell. Alternatively, the green body could be fired at temperatures below its melting point in an oxygen-containing atmosphere such as air to produce fired polycrystalline bodies with densities of at least about 85% of theoretical density. Alternatively, the titanate powder could be hot-pressed in an oxide die, preferably an alumina die press at temperatures of about 1573 K. to 1673 K. under a pressure of at least about 6000 psi to produce a hot pressed product having a density higher than 95% of theoretical density. These sintered or hot pressed products are useful, for example, as dielectric materials for capacitors and electrical circuits.

The invention is further illustrated by the following examples:

EXAMPLE 1

In this example, strontium titanate ($SrTiO_3$) was prepared without the use of titanate seed.

556.75 grams of reagent grade $SrCO_3$ (2% in excess of stoichiometry for $SrTiO_3$) ranging in size up to about 100 microns and 295.41 grams of reagent grade $TiO_2$ ranging in size up to about 100 microns were slurried at room temperature in absolute methanol (~1600 ml) for 20 minutes, then set to dry overnight in an infrared-heated oven. The resulting dried material was lightly comminuted in a mortar and pestle, then placed in a gallon glass jar with 245.40 g of 99% pure $Li_2CO_3$ and 279.08 g of 99.8% pure $K_2CO_3$ (dried at 523 K. for several hours and comminuted). The total powder mixture was homogenized by roll-tunbling for 10 minutes.

Equivalent amounts of the mixture were placed in three dense, covered 500 ml $\alpha-Al_2O_3$ crucibles and heated at 50 K. hour$^{-1}$ to 928 K. and held at 928 K. for 24 hours in an air atmosphere, then furnace cooled to room temperature.

A sample of the resulting lightly sintered, compacted mass was treated with aqueous 10% $CH_3COOH$ to dissolve away the alkali carbonates and excess $Sr^{+2}$ salt. The freed $SrTiO_3$ crystals were collected on a filter, washed with water, and dried.

The product was an off-white powder. X-ray diffraction analysis of the product indicated the product to be phase pure $SrTiO_3$. B.E.T. surface area measurements of the product yielded a value of 1.24 meters$^2$ gram$^{-1}$ which indicates a spherical equivalent average crystal diameter (SED) of 0.947 micron.

About 2.0 grams of the $SrTiO_3$ powder were compressed in a stainless steel die at room temperature under a pressure of 13.7 MPa to produce a compact.

Mercury intrusion porosimetry measurement of the resulting compact showed a total pore volume fraction of 0.5012, with a mean pore size of 0.611 $\mu$m.

X-ray diffraction analysis showed the product to be phase pure $SrTiO_3$ (the small $Li_2TiO_3$ content was not detected).

EXAMPLE 2

In this example titanate seed was not used.

A "master" $SrCO_3$-$TiO_2$ reactant mix containing 1230.79 g $SrCO_3$, 653.06 g $TiO_2$ was prepared as disclosed in Example 1, except that $H_2O$ replaced the methanol and drying was carried out at 423 K. in a convection oven. A "master" solvent mix of $Na_2CO_3$-40 mol % $K_2CO_3$ containing 802.43 g $Na_2CO_3$ and 697.57 g $K_2CO_3$ (dried as in Example 1) was roll-tumbled for 10 minutes in a gallon glass ar to homogenize. Three separate reaction mixtures were prepared, each based on 625.00 g of the master reactant mix and 25 (165.89 g), 37.5 (298.59 g) and 50 wt% (494.70 g) of solvent mix respectively. These were homogenized by roll-tumbling for 10 minutes.

Each mixture was divided into three approximately equal aliquots, each contained in an individual dense, covered 500 ml $\alpha-Al_2O_3$ crucible. A group of three aliquots, one with each of the solvent contents, three groups in all, was reacted by heating to the reaction temperature (1073, 1173 and 1273 K.) at 100 K. hour$^{-1}$ in an air atmosphere, holding 2 hours at reaction temperature, then cooling at <150 K. hour$^{-1}$ to room temperature. A total of nine samples, covering three solvent contents and three reaction temperatures were thus generated.

Each sample was placed in ~5 liter distilled $H_2O$ and, with vigorous stirring, sufficient concentrated $CH_3COOH$ added dropwise to convert the alkali carbonates and excess $Sr^{+2}$ to the respective acetates which dissolved away. The freed $SrTiO_3$ powder was collected, processed and evaluated as disclosed in Example 1. Compacts of the $SrTiO_3$ powder were produced and evaluated in the same manner disclosed in Example 1.

These runs are illustrated in Table I.

TABLE I

| Run | Reaction Temp. | Carbonate Solvent Content | BET Area ($m^2g^{-1}$) | SED ($\mu$m) | Compact of $SrTiO_3$ Product Powder | |
|---|---|---|---|---|---|---|
| | | | | | Total Porosity (Volume Fraction) | Mean Pore Size ($\mu$m) |
| 2A | 1073K | 25 wt % | 4.27 | 0.275 | 0.6168 | 0.328 |
| 2B | 1073K | 37.5 wt % | 3.36 | 0.349 | 0.5636 | 0.259 |
| 2C | 1073K | 50 wt % | 2.82 | 0.416 | 0.5554 | 0.255 |
| 2D | 1173K | 25 wt % | 2.36 | 0.498 | 0.5247 | 0.338 |
| 2E | 1173K | 37.5 wt % | 1.63 | 0.720 | 0.5401 | 0.417 |
| 2F | 1173K | 50 wt % | 1.40 | 0.839 | 0.5552 | 0.527 |
| 2G | 1273K | 25 wt % | 0.99 | 1.186 | 0.5259 | 0.569 |
| 2H | 1273K | 37.5 wt % | 0.86 | 1.365 | 0.4999 | 0.688 |
| 2I | 1273K | 50 wt % | 0.61 | 1.925 | 0.5093 | 0.990 |

X-ray diffraction analysis of the $SrTiO_3$ powder produced in each of the tabulated Runs of Table I indicated the powder was phase pure $SrTiO_3$.

The runs of Table I show that the higher the reaction temperature and the greater the carbonate solvent content, the larger is the average crystal size of the resulting $SrTiO_3$ powder.

In Table I, the effect of crystal size on compact interstitial void volume is graphically demonstrated, i.e. the pore volume increased significantly as the crystal size was reduced.

EXAMPLE 3

Past experiments have indicated that BaO reacts in substantially the same manner as SrO, and in that sense, it is substantially a chemical equivalent of SrO.

This is a paper example for the preparation of $BaTiO_3$. The procedure of this example is the same as that disclosed in Example 1 except that $BaCO_3$ is substituted for $SrCO_3$, and the resulting $BaTiO_3$ will not differ significantly in size from the $SrTiO_3$ powder produced in Example 1.

EXAMPLE 4

A portion of the "master" carbonate solvent mix produced in Example 2 was used in this example.

153.70 grams of the $SrTiO_3$ produced in Example 2I having an indicated average crystal size of 1.925 microns was combined with 126.11 grams $SrCO_3$ and 66.92 grams $TiO_2$ and was processed to produce a reactive mix as disclosed in Example 2. The resulting reactant mix was combined with 307.47 grams of the $Na_2CO_3$-$K_2CO_3$ solvent mix (giving 50 weight % solvent on $SrTiO_3$ basis, i.e. 50% by weight of the $SrTiO_3$ which should be present upon completion of the reaction), and roll-tumbled to homogenize.

The resulting mixture was placed in a covered 500 ml $\alpha$-$Al_2O_3$ crucible and reacted by heating to 1273 K. at 100 K.$^{-1}$ in air, holding two hours at reaction temperature, then cooled at 150 K. $Hr^{-1}$ to room temperature.

The reaction product was treated as disclosed in Example 2 to retrieve the $SrTiO_3$ powder which was collected, processed and evaluated as disclosed in Example 2. 307.4 grams of $SrTiO_3$ powder were recovered.

Compacts of the $SrTiO_3$ powder were produced and evaluated in the same manner as disclosed in Example 1.

This experiment is shown as Run 4 in Table II. The procedure used in Run 4A shown in Table II was the same as that set forth for Run 4 except that 153.70 grams of the $SrTiO_3$ powder produced in Run 4 were used as the titanate seed in Run 4A. The procedure used in each of the remaining tabulated Runs of Table II was the same as disclosed for Run 4A except that the titanate seed used in each of these runs was composed of 153.70 grams of the $SrTiO_3$ powder produced in the preceding tabulated run.

TABLE II

| | $SrTiO_3$ Product Powder | | Compact of $SrTiO_3$ Powder | |
|---|---|---|---|---|
| Run | B.E.T. Area ($m^2g^{-1}$) | S.E.D. ($\mu m$) | Total Porosity (Volume Fraction) | Mean Pore Size ($\mu m$) |
| 4 | 0.40 | 2.935 | 0.4982 | 1.562 |
| 4A | 0.23 | 5.105 | 0.4872 | 2.300 |
| 4B | 0.18 | 6.523 | 0.4703 | 2.930 |
| 4C | 0.13 | 9.032 | 0.4720 | 3.820 |
| 4D | 0.11 | 10.674 | 0.4725 | 4.737 |
| 4E | 0.09 | 13.046 | 0.4957 | 6.641 |
| 4F | 0.09 | 13.046 | 0.4484 | 5.672 |
| 4G | 0.11 | 10.674 | 0.4319 | 4.555 |

All of the runs of Table II illustrate the present invention.

X-ray diffraction analysis of the $SrTiO_3$ powder produced in each of the tabulated runs of Table II indicated the powder was phase pure $SrTiO_3$.

In Table II, the effect of crystal size on compact interstitial void volume is graphically demonstrated, i.e. the pore volume increased significantly as the crystallite size was reduced.

The compacts of Runs 4 to 4G would be useful as matrices in a molten carbonate fuel cell.

The data of Table II indicates that $SrTiO_3$ with a relative narrow crystal size distribution can be prepared in the range 0.3-14.0 $\mu m$. This uniformity is illustrated by the dependence of mean pore size of the compacts on the size of the crystals forming them.

By variation in sample composition, i.e., "seed" content varying from 50 to 90% of the reactant mix, it should be possible to prepare $SrTiO_3$ crystallite with any pre-selected S.E.D. in the range 0.3-14.0 $\mu m$.

EXAMPLE 5

Past experiments have indicated that BaO reacts in substantially the same manner as SrO, and in that sense, it is substantially a chemical equivalent of SrO.

This is a paper example for the preparation of large size $BaTiO_3$. The procedure of this example is the same as that disclosed in Example 4 except that $BaCO_3$ is substituted for $SrCO_3$, and $BaTiO_3$ seed is substituted for $SrTiO_3$ seed, and the resulting $BaTiO_3$ will not differ significantly in size from the $SrTiO_3$ powder produced in Example 4.

What is claimed is:

1. A process for producing large size alkaline earth titanate powder having a preselected average crystal size ranging from about 0.3 micron to about 14 microns which consists essentially of providing particulate $TiO_2$ in stoichiometric amount, providing particulate alkaline earth carbonate in an amount ranging from about 2% by weight to about 10% by weight in excess of stoichiometric amount, said alkaline earth carbonate being selected from the group consisting of $BaCO_3$, $SrCO_3$ and mixtures thereof, providing alkaline earth titanate seed selected from the group consisting of barium titanate, strontium titanate and a solid solution thereof, providing an alkali metal carbonate solvent selected from the group consisting of sodium carbonate, potassium carbonate, lithium carbonate and mixtures thereof, forming a mixture of said $TiO_2$, said alkaline earth carbonate, said titanate seed and said carbonate solvent, heating said mixture to a reaction temperature at least sufficient to melt said carbonate solvent and ranging from about 873 K. to about 1473 K., each said alkaline earth carbonate being decomposable at said reaction temperature to form the oxide and by-product gas, said carbonate solvent in molten form being a solvent for said $TiO_2$ and said alkaline earth carbonate, maintaining said reaction temperature continually dissolving and reacting said $TiO_2$ and alkaline earth carbonate in said molten solvent producing by-product gas and precipitating alkaline earth titanate onto said titanate seed, at said reaction temperature said $TiO_2$ and said alkaline earth carbonate being slightly soluble in said molten solvent to maintain a reactant-saturated solution, said titanate seed having an average crystal size ranging from submicron to about 10 microns and being used in an amount ranging from about 50% by weight to about 90% by weight of the theoretical amount of said large size alkaline earth titanate powder, said titanate seed not differing significantly in chemical composition from said precipitating alkaline earth titanate, said carbonate solvent being used in an amount ranging from about 20% by weight to about 70% by weight of the total amount of said $TiO_2$, said alkaline earth carbonate, said titanate seed and said carbonate solvent, and recovering the resulting alkaline earth titanate.

2. A process for producing large size strontium titanate powder having a preselected average crystal size ranging from about 0.3 micron to about 14 microns which consists essentially of providing particulate $TiO_2$ in stoichiometric amount, providing particulate $SrCO_3$ in an amount ranging from about 2% by weight to about 10% by weight in excess of stoichiometric amount, providing $SrTiO_3$ seed, providing an alkali metal carbonate solvent selected from the group consisting of sodium carbonate, potassium carbonate, lithium carbonate and mixtures thereof, forming a mixture of said $TiO_2$, said $SrCO_3$, said $SrTiO_3$ seed and said carbonate solvent, heating said mixture to a reaction temperature at least sufficient to melt said carbonate solvent and ranging from about 873 K. to about 1473 K., said $SrCO_3$ being decomposible at said reaction temperature to form the oxide and by-product gas, said carbonate solvent in molten form being a solvent for said $TiO_2$ and said $SrCO_3$, maintaining said reaction temperature continually dissolving and reacting said $TiO_2$ and $SrCO_3$ in said molten solvent producing by-product gas and precipitating $SrTiO_3$ onto said $SrTiO_3$ seed, at said reaction temperature said $TiO_2$ and said $SrCO_3$ being slightly soluble in said molten solvent to maintain a reactant-saturated solution, said $SrTiO_3$ seed having an average crystal size ranging from submicron to about 10 microns and being used in an amount ranging from about 50% by weight to about 90% by weight of the theoretical amount of said large size strontium titanate powder, said carbonate solvent being used in an amount ranging from about 20% by weight to about 70% by weight of the total amount of said $TiO_2$, said $SrCO_3$, said $SrTiO_3$ seed and said carbonate solvent, and recovering the resulting large size strontium titanate powder.

3. The process according to claim 2 wherein said reaction temperature ranges from about 1073 K. to about 1273 K. and is at least about ten degrees higher than the liquidus temperature for said carbonate solvent.

4. The process according to claim 2 wherein said strontium titanate is recovered by dissolving away said alkali carbonate.

* * * * *